United States Patent
Sugahara

(10) Patent No.: US 9,537,655 B2
(45) Date of Patent: Jan. 3, 2017

(54) RANDOM NUMBER GENERATING DEVICE, CIPHER PROCESSING DEVICE, STORAGE DEVICE, AND INFORMATION PROCESSING SYSTEM

(71) Applicant: MegaChips Corporation, Osaka-shi (JP)

(72) Inventor: Takahiko Sugahara, Nishinomiya (JP)

(73) Assignee: MegaChips Corporation, Osaka-shi (JP)

( * ) Notice: Subject to any disclaimer, the term of this patent is extended or adjusted under 35 U.S.C. 154(b) by 66 days.

(21) Appl. No.: 14/265,588

(22) Filed: Apr. 30, 2014

(65) Prior Publication Data

US 2014/0341375 A1   Nov. 20, 2014

(30) Foreign Application Priority Data

May 16, 2013   (JP) .................................. 2013-103613

(51) Int. Cl.
| | | |
|---|---|---|
| *G06F 21/00* | (2013.01) | |
| *H04L 9/08* | (2006.01) | |
| *H04L 9/26* | (2006.01) | |
| *G09C 1/00* | (2006.01) | |
| *G06F 7/58* | (2006.01) | |

(52) U.S. Cl.
CPC ............. *H04L 9/0869* (2013.01); *G06F 7/588* (2013.01); *G09C 1/00* (2013.01); *H04L 9/26* (2013.01); *H04L 2209/12* (2013.01)

(58) Field of Classification Search
CPC ...... H04L 9/0869; H04L 9/26; H04L 2209/12; G06F 7/588; G09C 1/00
USPC .............................................. 380/46, 44, 268
See application file for complete search history.

(56) References Cited

U.S. PATENT DOCUMENTS

| | | | |
|---|---|---|---|
| 7,111,029 B2 | 9/2006 | Fujita et al. | |
| 7,395,288 B2 | 7/2008 | Fujita et al. | |
| 8,073,889 B2 | 12/2011 | Fujita et al. | |
| 2010/0211787 A1* | 8/2010 | Bukshpun | H04L 9/0838 713/170 |
| 2011/0016263 A1* | 1/2011 | Lin | G11C 29/02 711/103 |
| 2014/0195576 A1* | 7/2014 | Kaplan | G06F 7/588 708/250 |

FOREIGN PATENT DOCUMENTS

| | | |
|---|---|---|
| JP | 2003-173254 | 6/2003 |
| JP | 2004-234153 | 8/2004 |

* cited by examiner

*Primary Examiner* — Sarah Su
(74) *Attorney, Agent, or Firm* — Oblon, McClelland, Maier & Neustadt, L.L.P.

(57) ABSTRACT

A random number generating device includes an uncertain circuit which outputs uncertain data, and a cipher processing device. The cipher processing device encrypts input data using a cipher function of the cipher processing device, and generates a random number including higher uniformity than data outputted from said uncertain circuit using the cipher function of the cipher processing device and the data outputted from the uncertain circuit.

5 Claims, 3 Drawing Sheets

F I G . 1
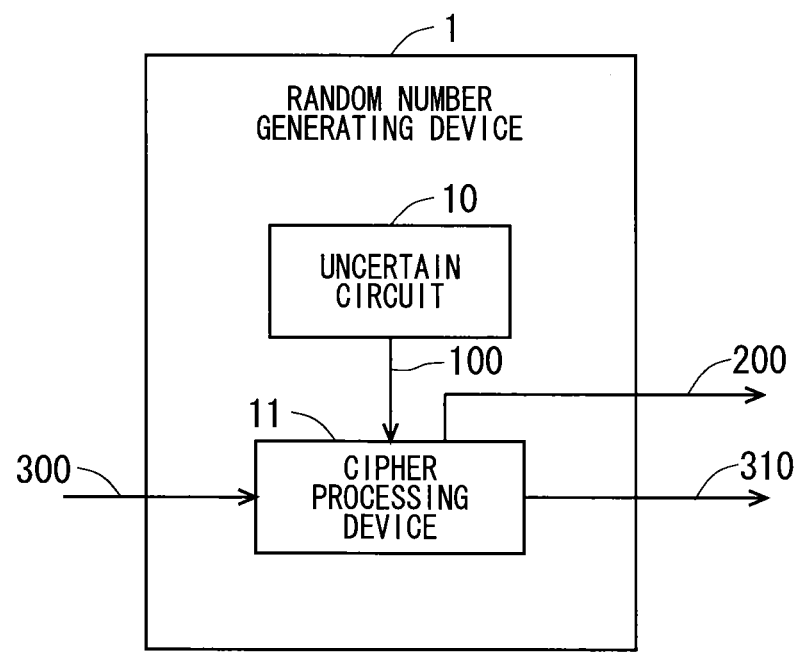

RANDOM NUMBER GENERATING DEVICE, CIPHER PROCESSING DEVICE, STORAGE DEVICE, AND INFORMATION PROCESSING SYSTEM

BACKGROUND OF THE INVENTION

Field of the Invention

The present invention relates to cipher processing.

Description of the Background Art

As described in Japanese Patent Application Laid-Open No. 2004-234153, various techniques related to cipher processing are conventionally proposed. Further, Japanese Patent Application Laid-Open No. 2003-173254 discloses a random number generating technique.

SUMMARY OF THE INVENTION

As described in Japanese Patent Application Laid-Open No. 2004-234153, generation of random numbers and cipher processing are performed in the same device in some cases. Such a device or other devices are desired to perform processing with a simple configuration, that is, at low cost.

The present invention has been made in view of the above, and an object thereof is to provide a technique in which processing can be performed with a simple configuration, that is, at low cost.

A random number generating device according to a first aspect of the present invention includes: an uncertain circuit which outputs uncertain data; and a cipher processing device, wherein the cipher processing device encrypts input data using a cipher function of the cipher processing device, and generates a random number having higher uniformity than data outputted from said uncertain circuit using the cipher function of the cipher processing device and the data outputted from the uncertain circuit.

The random number generating device according to a second aspect of the present invention is based on the first aspect of the present invention, wherein the random number is used as a key used in cipher or as an authentication code used in authentication.

The random number generating device according to a third aspect of the present invention is based on the second aspect of the present invention, wherein the random number is inputted as the key to the cipher processing device.

A storage device according to a fourth aspect of the present invention includes: a random number generating device; and a storage unit, wherein the random number generating device includes an uncertain circuit which outputs uncertain data, and a cipher processing device, and the cipher processing device encrypts data read from the storage unit using a cipher function of the cipher processing device, and generates a random number having higher uniformity than data outputted from said uncertain circuit using the cipher function of the cipher processing device and the data outputted from the uncertain circuit.

An information processing system according to a fifth aspect of the present invention includes: a storage device which includes a random number generating device and a storage unit; a host device which controls the storage device, wherein the random number generating device includes an uncertain circuit which outputs uncertain data, and a cipher processing device, and the cipher processing device encrypts data read from the storage unit using a cipher function of the cipher processing device, and generates a random number having higher uniformity than data outputted from said uncertain circuit using the cipher function of the cipher processing device and the data outputted from the uncertain circuit.

A cipher processing device according to a sixth aspect of the present invention includes a key generating unit which includes a cipher function and generates a key using the cipher function, wherein the key generating unit generates a first key using data and the cipher function of the key generating unit, and generates a second key using the first key and the cipher function of the key generating unit.

The cipher processing device according to a seventh aspect of the present invention is based on the sixth aspect of the present invention, wherein the data is uncertain data outputted from an uncertain circuit.

The cipher processing device according to an eighth aspect of the present invention is based on the sixth aspect of the present invention, and further includes a cipher processing unit which includes the cipher function, wherein the cipher processing unit uses, as a key of the cipher processing unit, one of the first and second keys generated by the key generating unit.

The cipher processing device according to a ninth aspect of the present invention is based on the eighth aspect of the present invention, wherein the cipher processing unit uses, as the key of the cipher processing unit, the second key generated by the key generating unit.

An information processing system according to a tenth aspect of the present invention includes a storage device and a host device which perform ciphered communication with each other, wherein the storage device includes an uncertain circuit which outputs uncertain data, and a cipher processing device which encrypts data, the cipher processing device generates a first key using a cipher function of the cipher processing device and the data outputted from the uncertain circuit, the storage device outputs the first key generated by the cipher processing device, to the host device, the host device generates a second key and outputs the second key to the storage device, the cipher processing device uses the first key generated by the cipher processing device and the second key from the host device as common keys, and the host device uses the second key generated by the host device and the first key from the storage device as the common keys.

The information processing system according to an eleventh aspect of the present invention is based on the tenth aspect of the present invention, wherein the storage device outputs the first key encrypted by the cipher processing device, to the host device.

The information processing system according to a twelfth aspect of the present invention is based on the tenth aspect of the present invention, wherein the host device encrypts the second key and outputs the second key to the storage device.

It is possible to perform processing with a simple configuration, that is, at low cost.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a diagram illustrating a configuration of a random number generating device;

DESCRIPTION OF THE PREFERRED EMBODIMENTS

Figure 2:
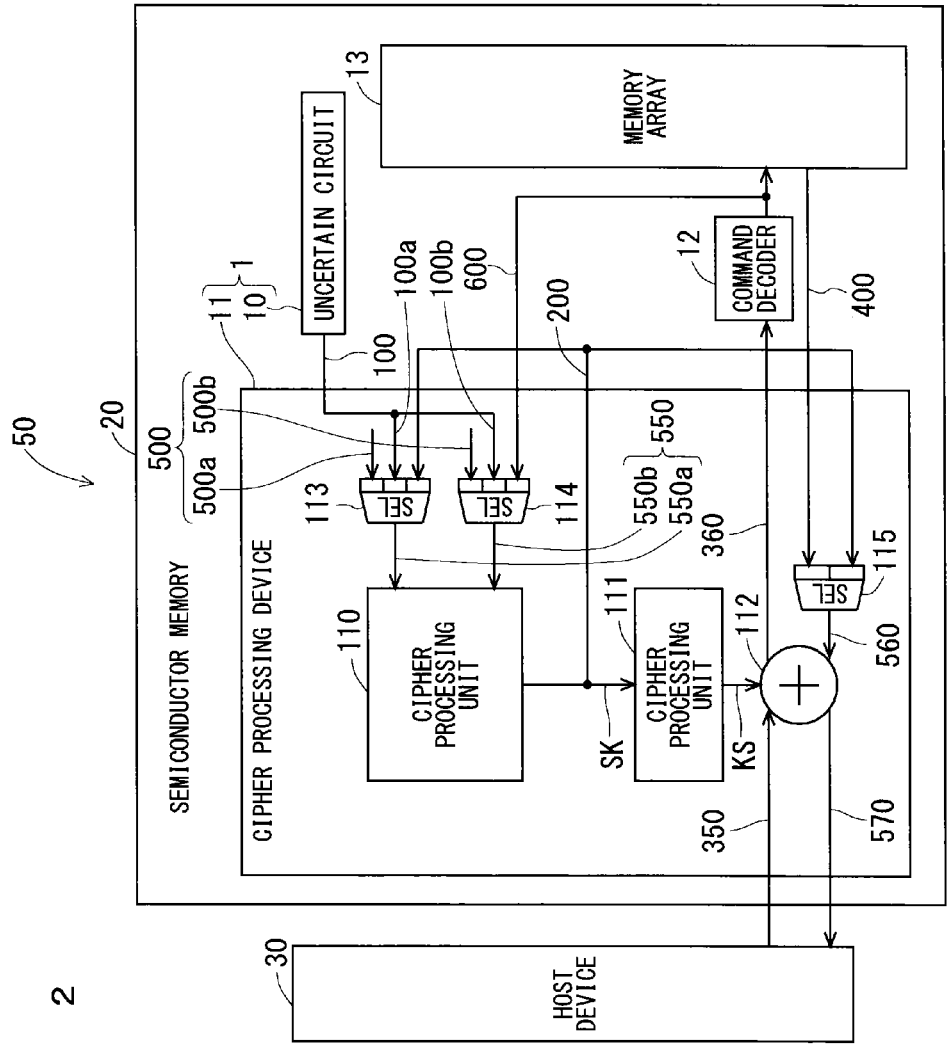
FIG. 2 is a diagram illustrating a configuration of a memory system.

FIG. 1 is a diagram illustrating a configuration of a random number generating device 1 according to a preferred embodiment. The random number generating device 1 according to the present preferred embodiment generates and outputs a random number of high uniformity, and possesses a cipher function of encrypting input data. As illustrated in FIG. 2, the random number generating device 1 includes an uncertain circuit 10 and a cipher processing device 11.

The uncertain circuit 10 generates and outputs uncertain data 100. The data 100 is digital data. The uncertain circuit 10 can generate the uncertain data 100 using, for example, thermal noise of a resistor or a diode. Further, the uncertain circuit 10 can generate the uncertain data 100 using, for example, fluctuation of a crystal oscillator. Furthermore, as described in Japanese Patent Application Laid-Open No. 2003-173254, the uncertain circuit 10 can generate the uncertain data 100 using, for example, a logic circuit such as an RS flip-flop. The uncertain circuit 10 which generates uncertain data using a logic circuit is also referred to as an "uncertain logic circuit". The data 100 outputted from the uncertain circuit 10 can be regarded as a random number of low uniformity which has irreproducibility. The random number of low uniformity has low entropy (randomness) and the random number of the low entropy has a low intrinsic degree, and therefore the data 100 is a random number of a low intrinsic degree.

The cipher processing device 11 possesses a cipher function, and encrypts input data 300 using the cipher function and outputs the encrypted input data 300 as ciphered data 310. Further, the cipher processing device 11 generates a random number 200 having higher uniformity than data 100 outputted from said uncertain circuit using the cipher function of the cipher processing device 11 and the data 100 outputted from the uncertain circuit 10, and outputs the random number 200. That is, the cipher processing device 11 generates the random number 200 whose difference between appearance frequencies (appearance probability) of "1" and "0" is less than data 100 outputted from said uncertain circuit (the random number 200 which includes a less value bias than t data 100 outputted from said uncertain circuit) using the cipher function of the cipher processing device 11 and the data 100, and outputs the random number 200. The cipher processing device 11 has a function of a uniformization circuit which increases uniformity of data. The random number 200 generated by the cipher processing device 11 is digital data of high uniformity which has irreproducibility. Entropy of a random number of high uniformity is high, and the random number of the high entropy has a high intrinsic degree, and therefore the random number 200 is a random number of a high intrinsic degree. The cipher processing device 11 may decrypt encrypted data using the cipher function of the cipher processing device 11.

The random number 200 of the high intrinsic degree generated by the random number generating device 1 can be used as, for example, information of high confidentiality. The information of high confidentiality is, for example, a key used in cipher or an authentication code used in authentication. The random number 200 can be used as a key used in a cipher algorithm such as a DES (Data Encryption Standard) or an AES (Advanced Encryption Standard). Further, the random number 200 can be used as, for example, an authentication code used between a plurality of devices upon mutual authentication between the plurality of devices.

As described above, the random number generating device 1 according to the present preferred embodiment generates the random number 200 of high uniformity using the cipher function of the cipher processing device 11 and the data 100 outputted from the uncertain circuit 10. Thus, it is not necessary to provide, in addition to the cipher processing device 11, the uniformization circuit which uniformizes the data 100 to increase the entropy of the data 100 outputted from the uncertain circuit 10. Consequently, it is possible to perform cipher processing and generate a random number of a high intrinsic degree with a simple configuration. As a result, it is possible to reduce cost of a device which performs the cipher processing and generates a random number. As described in Japanese Patent Application Laid-Open No. 2004-234153, the uniformization circuit is also referred to as a "smoothing circuit". Further, as in the present preferred embodiment, it is possible to minimize an overhead of a circuit scale by securing uniformity of the random number 200 using part of the cipher processing device 11.

<Example of Use of Random Number Generating Device>

Next, an example of use of the random number generating device 1 and a configuration example of the cipher processing device 11 will be described. FIG. 2 is a block diagram illustrating a memory system 50 which includes a semiconductor memory 20 on which the random number generating device 1 is mounted.

As illustrated in FIG. 2, the memory system 50 which is one type of an information processing system includes the semiconductor memory 20 which has the random number generating device 1, and a host device 30 which controls the semiconductor memory 20. The semiconductor memory 20 which is one type of the storage device and the host device 30 perform ciphered communication with each other.

The memory system 50 is, for example, a computer system which is mounted on a game device. The game device includes a game device main body and a game cartridge which is attachable to and detachable from the game device main body. The semiconductor memory 20 is built in the game cartridge, and the host device 30 is built in the game device main body. The host device 30 is one type of a computer. A user can enjoy various types of games by exchanging the game cartridge which is attached to the game device main body. The memory system 50 exchanges a key used in cipher between the host device 30 and the semiconductor memory 20.

The semiconductor memory 20 is, for example, a mask ROM (Read Only Memory). The semiconductor memory 20 includes the uncertain circuit 10 and the cipher processing device 11 which configure the random number generating device 1, a command decoder 12, and a memory array 13 which is a storage unit. In this example, the cipher processing device 11 is used to achieve security of the semiconductor memory 20. Further, the random number 200 generated by the random number generating device 1 is inputted as a key to the cipher processing device 11.

The cipher processing device 11 illustrated in FIG. 2 encrypts and decrypts data using, for example, a stream cryptosystem which is one type of a common key cryptosystem. Note that the cipher processing device 11 may encrypt and decrypt data using a block cryptosystem which is one type of the common key cryptosystem. Further, the cipher processing device 11 may encrypt and decrypt data using the public key cryptosystem.

The cipher processing device 11 includes a plurality of cipher processing units 110 and 111, an arithmetic circuit 112, a first selection circuit 113, a second selection circuit 114, and a third selection circuit 115. The cipher processing units 110 and 111 each have a cipher function. The cipher processing units 110 and 111 may use the same cryptographic algorithm or different cryptographic algorithms. The cryptographic algorithm used by the cipher processing units 110 and 111 is, for example, the DES or the AES. In the cipher processing device 11 in this example, the cipher processing unit 110 generates the random number 200 of high uniformity using the cipher function of the cipher processing unit 110 (the cryptographic algorithm of the cipher processing unit 110) and the data 100 outputted from the uncertain circuit 10.

The first selection circuit 113 selects one of three pieces of data to be inputted, based on a first control signal to be inputted, and outputs the selected data as data 550*a* to the cipher processing unit 110. Further, the second selection circuit 114 selects one of three pieces of data to be inputted, based on a second control signal to be inputted, and outputs the selected data as data 550*b* to the cipher processing unit 110.

In the present preferred embodiment, the data 550*a* outputted from the first selection circuit 113 and the data 550*b* outputted from the second selection circuit 114 configure a common key 550 used by the cipher processing unit 110. The cipher processing unit 110 initializes the cipher processing unit 110 (initializes the cryptographic algorithm of the cipher processing unit 110) based on this common key 550. Hereinafter, the data 550*a* and the data 550*b* which configure the common key 550 are referred to as a "first common key 550*a*" and a "second common key 550*b*", respectively. The first common key 550*a* is, for example, high order data of the common key 550, and the second common key 550*b* is, for example, low order data of the common key 550. Note that the first common key 550*a* may be part of the common key 550, and may not be the high order data of the common key 550. Further, the second common key 550*b* only needs to be a portion of the common key 550 other than the first common key 550*a*, and may not be the low order data of the common key 550.

The first selection circuit 113 receives an input of three pieces of data of a first fixed key 500*a* which is part of a fixed key 500 stored in advance in the cipher processing device 11, first data 100*a* which is part of the data 100 outputted from the uncertain circuit 10, and the random number 200 which is generated by the cipher processing device 11. When, for example, the first selection circuit 113 selects the first fixed key 500*a*, the first fixed key 500*a* is inputted as the first common key 550*a* to the cipher processing unit 110.

The second selection circuit 114 receives an input of three pieces of data of a second fixed key 500*b* which is a portion of the fixed key 500 other than the first fixed key 500*a*, second data 100*b* which is a portion of the data 100 outputted from the uncertain circuit 10 other than the first data 100*a*, and a random number 600 which is sent from the host device 30. When, for example, the second selection circuit 114 selects the random number 600, the random number 600 is inputted as the second common key 550*b* to the cipher processing unit 110. As described below, the random number 600 is outputted from the command decoder 12. Hereinafter, the random number 200 may be referred to as a "memory random number 200", and the random number 600 may be referred to as a "host random number 600".

The third selection circuit 115 selects one of two pieces of data to be inputted, based on a third control signal to be inputted, and outputs the selected data as output data 560 to the arithmetic circuit 112. The third selection circuit 115 receives an input of two pieces of data of the memory random number 200 and data 400 (hereinafter, referred to as "memory data 400") outputted from the memory array 13. When, for example, the third selection circuit 115 selects the memory data 400, the memory data 400 is the output data 560. Note that the first to third control signals for controlling the first selection circuit 113 to the third selection circuit 115 are generated in, for example, the semiconductor memory 20.

The cipher processing unit 111 initializes the cipher processing unit 111 (initializes the cryptographic algorithm of the cipher processing unit 111) based on a below-described session key SK outputted from the cipher processing unit 110. The initialized cipher processing unit 111 generates a key stream KS using the cipher function of the cipher processing unit 111 (the cryptographic algorithm of the cipher processing unit 111), and outputs the key stream KS. In other words, the initialized cipher processing unit 111 generates the key stream KS by performing cipher processing, and outputs the key stream KS.

The arithmetic circuit 112 performs an exclusive OR operation of the key stream KS which is outputted from the cipher processing unit 111 and an encrypted command 350 (hereinafter, also referred to as a "ciphered command 350") which is outputted from the host device 30, and outputs the exclusive OR. Accordingly, the ciphered command 350 from the host device 30 is decrypted. The decrypted ciphered command 350 is inputted as a plaintext command 360 to the command decoder 12.

Further, the arithmetic circuit 112 performs exclusive OR operation of the key stream KS which is outputted from the cipher processing unit 111 and the output data 560 from the third selection circuit 115, and outputs the exclusive OR. Accordingly, the output data 560 is encrypted. The encrypted output data 560 is outputted as ciphered data 570.

In this manner, the arithmetic circuit 112 encrypts or decrypts data to be inputted, using the data outputted from the cipher processing unit 111 as the key stream KS.

The command decoder 12 decodes the plaintext command 360 to be inputted, and analyzes the plaintext command 360. As a result of analyzing the plaintext command 360 to be inputted, when the plaintext command 360 is a read command which commands to read data from the memory array 13, the command decoder 12 outputs control signals such as an address signal and a read signal to the memory array 13. Accordingly, the memory data 400 is outputted from the memory array 13. In the memory array 13, for example, a plurality of game programs or various pieces of data used by each game program are stored. When the memory data 400 is outputted from the third selection circuit 115, the memory data 400 is encrypted in the arithmetic circuit 112, and the encrypted memory data 400 is inputted to the host device 30. When a game program is included in the memory data 400 to be inputted, the host device 30 executes the game program.

Further, the command decoder 12 decodes the plaintext command 360 to be inputted and extracts a host random number 600 which is included in the plaintext command 360 and is generated by the host device 30. The command decoder 12 outputs the extracted host random number 600 to the second selection circuit 114.

The host device 30 is provided with a random number generating device (hereinafter, referred to as a "host side random number generating device") which is similar to the random number generating device 1 of the semiconductor memory 20. The host side random number generating device has an uncertain circuit (hereinafter, referred to as a "host side uncertain circuit") which is similar to the uncertain circuit 10, and a cipher processing device (hereinafter, referred to as a "host side cipher processing device") which is similar to the cipher processing device 11. The host device 30 encrypts a command using the host side cipher processing device, and outputs the encrypted command (ciphered command 350) to the semiconductor memory 20. Further, the host device 30 decrypts the ciphered data 570 from the semiconductor memory 20 using the host side cipher processing device.

Furthermore, similar to the random number generating device 1, the host side random number generating device generates the host random number 600 of high uniformity using the cipher function of the host side random number generating device and data outputted from the host side uncertain circuit. The host device 30 outputs a predetermined command including the generated host random number 600, to the semiconductor memory 20. Note that the host side random number generating device may generate the host random number 600 by a method different from that of the random number generating device 1 of the semiconductor memory 20.

The memory system 50 according to the present preferred embodiment uses the host random number 600 and the memory random number 200 as keys. Key exchange is performed by exchanging the host random number 600 and the memory random number 200 between the host device 30 and the semiconductor memory 20.

<Key Exchange of Memory System>

Figure 3:
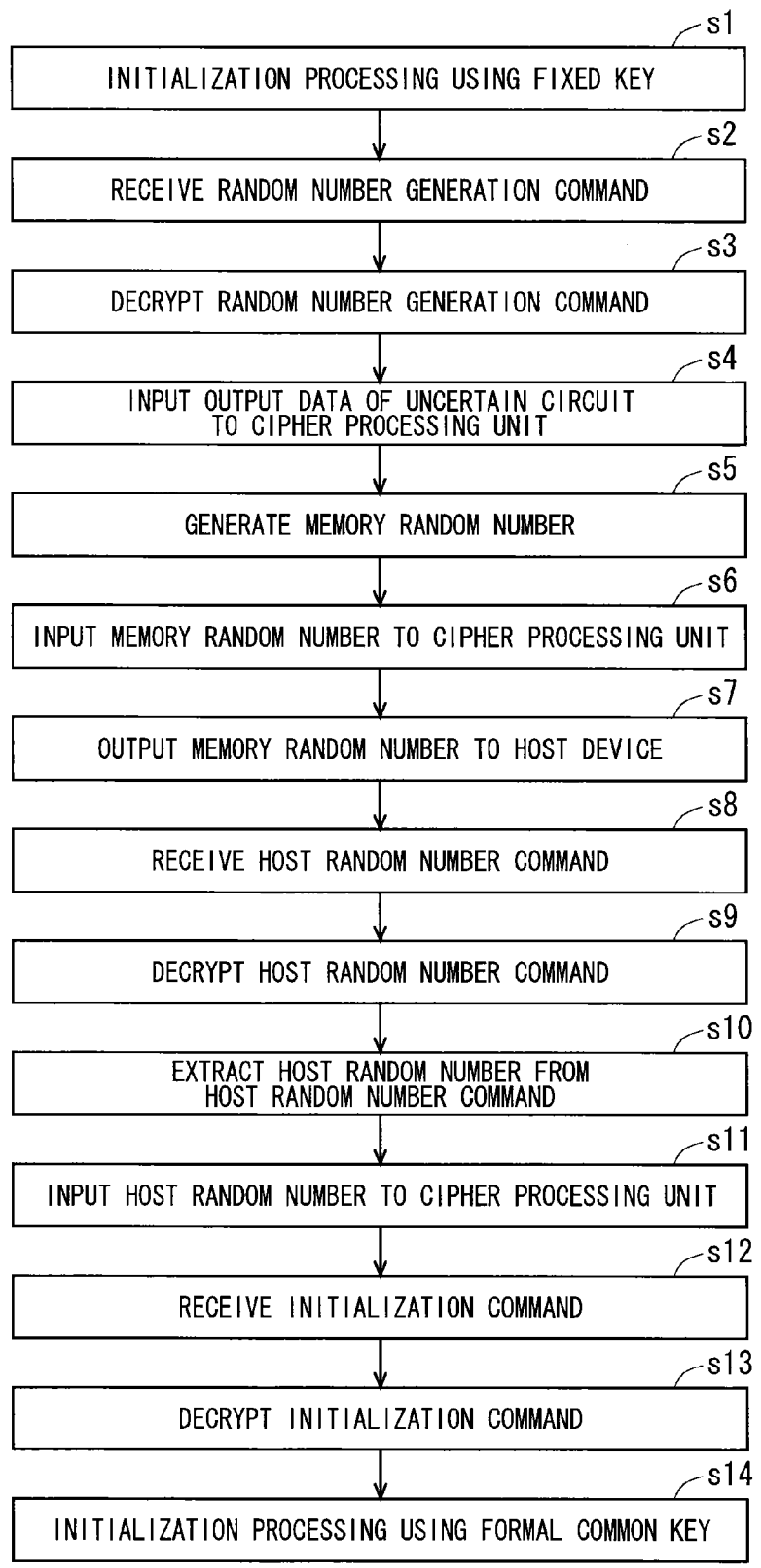
FIG. 3 is a flowchart illustrating an operation of a semiconductor memory.

Next, an operation of the memory system 50 when key exchange is performed between the host device 30 and the semiconductor memory 20 will be described. FIG. 3 is a flowchart illustrating an operation of the semiconductor memory 20 when key exchange is performed between the host device 30 and the semiconductor memory 20.

As illustrated in FIG. 3, in step s1, the semiconductor memory 20 performs processing of initializing the cipher processing device 11 using the fixed key 500. This initialization processing is processing which is required to perform key exchange between the host device 30 and the semiconductor memory 20.

In step s1, the first selection circuit 113 selects and outputs the first fixed key 500a, and the second selection circuit 114 selects and outputs the second fixed key 500b. Accordingly, the cipher processing unit 110 receives an input of the fixed key 500 as the common key 550. The cipher processing unit 110 initializes the cipher processing unit 110 (initializes the cryptographic algorithm of the cipher processing unit 110) based on the inputted fixed key 500 (common key 550). Further, the initialized cipher processing unit 110 generates the session key SK using the cipher function of the cipher processing unit 110, and outputs the session key SK to the cipher processing unit 111. In other words, the initialized cipher processing unit 110 generates the session key SK by performing cipher processing, and outputs the session key SK. In step s1, an output of the cryptographic algorithm initialized based on the fixed key 500 in the cipher processing unit 110 is the session key SK.

Further, in step s1, the cipher processing unit 111 initializes the cipher processing unit 111 (initializes the cryptographic algorithm of the cipher processing unit 111) based on the inputted session key SK. Furthermore, the initialized cipher processing unit 111 generates the key stream KS using the cipher function of the cipher processing unit 111, and outputs the key stream KS to the arithmetic circuit 112. In step s1, an output of the cryptographic algorithm initialized using the session key SK in the cipher processing unit 111 is the key stream KS. Hereinafter, this key stream KS is particularly referred to as a "key stream KS for key exchange".

Similarly, the host device 30 performs processing of initializing the host side cipher processing device using the same fixed key as the fixed key 500. Accordingly, the same key stream as the key stream KS for key exchange (hereinafter, also referred to as a "host side key stream for key exchange") is also generated in the host side cipher processing device.

The host device 30 generates the host side key stream for key exchange, and then encrypts a random number generation command using the host side key stream for key exchange. The random number generation command is a command which commands the semiconductor memory 20 to generate the memory random number 200. The host device 30 outputs the encrypted random number generation command to the semiconductor memory 20.

When the semiconductor memory 20 receives the encrypted random number generation command in step s2, the arithmetic circuit 112 decrypts the random number generation command using the key stream KS for key exchange in step s3. The decrypted random number generation command is inputted to the command decoder 12.

When the command decoder 12 analyzes the random number generation command, in step s4, the first selection circuit 113 selects and outputs the first data 100a and the second selection circuit 114 selects and outputs the second data 100b. Accordingly, the data 100 outputted from the uncertain circuit 10 is inputted as the common key 550 (the temporary common key 550) for generating a random number to the cipher processing unit 110.

Next, in step s5, the cipher processing unit 110 which functions as a key generating unit which generates a key generates the memory random number 200 having higher uniformity than data 100 outputted from said uncertain circuit using the cipher function of the cipher processing unit 110 (the cryptographic algorithm of the cipher processing unit 110) and the inputted data 100 (the common key 550 for generating a random number), and outputs the memory random number 200. More specifically, the cipher processing unit 110 initializes the cipher processing unit 110 based on the data 100. Further, the initialized cipher processing unit 110 generates the memory random number 200 using the cipher function of the cipher processing unit 110, and outputs the memory random number 200. In step s5, an output of the cryptographic algorithm initialized based on the data 100 (a random number of low uniformity) in the cipher processing unit 110 is the memory random number 200 of high uniformity. The output of the cryptographic algorithm has unpredictability from the nature of the cryptographic algorithm, and so a difference between appearance probabilities of "0" and "1" is a little in the cryptographic algorithm. Consequently, the cipher processing unit 110 can generate the memory random number 200 of high uniformity.

When the cipher processing unit 110 generates the memory random number 200, the first selection circuit 113 selects and outputs the memory random number 200 in step s6. Accordingly, the memory random number 200 is inputted as the formal first common key 550a which is used for key exchange, to the cipher processing unit 110.

Next, in step s7, the semiconductor memory 20 outputs the memory random number 200 as a key generated in step s5, to the host device 30. In step s7, the third selection circuit 115 selects and outputs the memory random number 200. Accordingly, the arithmetic circuit 112 receives an input of the memory random number 200 as the output data 560. The arithmetic circuit 112 performs an exclusive OR operation of the inputted memory random number 200 and the key stream KS for key exchange, and outputs the exclusive OR. Accordingly, the memory random number 200 encrypted using the key stream KS for key exchange is inputted as the ciphered data 570 to the host device 30.

When the encrypted memory random number 200 is inputted to the host device 30, the host side cipher processing device decrypts the memory random number 200 using the host side key stream for key exchange. Further, similar to the semiconductor memory 20, the host device 30 generates the host random number 600 which is used as a key. Furthermore, the host device 30 generates a host random number command including the generated host random number 600. This host random number command is encrypted based on the host side key stream for key exchange in the host side cipher processing device. The encrypted host random number command is inputted to the semiconductor memory 20.

When the semiconductor memory 20 receives the encrypted host random number command in step s8, the cipher processing device 11 decrypts the host random number command using the key stream KS for key exchange in step s9. The decrypted host random number command is inputted to the command decoder 12.

Next, in step s10, the command decoder 12 decodes the host random number command, and extracts the host random number 600 from the host random number command. When the host random number 600 is acquired, the second selection circuit 114 selects and outputs the host random number 600 in step s11. Accordingly, the host random number 600 is inputted as the formal second common key 550b which is used after key exchange, to the cipher processing unit 110. The cipher processing unit 110 receives an input of the formal common key 550 including the memory random number 200 and the host random number 600.

Similar to the semiconductor memory 20, in the host device 30, the cipher processing unit of the host side cipher processing device corresponding to the cipher processing unit 110 also receives an input of an formal common key g the memory random number 200 and the host random number 600 from the semiconductor memory 20.

The host device 30 generates an initialization command which commands the semiconductor memory 20 to perform processing of initializing the cipher processing device 11 using the formal common key 550. Further, in the host device 30, the host side cipher processing device encrypts the initialization command using the host side key stream for key exchange. The encrypted initialization command is inputted to the semiconductor memory 20.

In step s12, when the semiconductor memory 20 receives the encrypted initialization command, the arithmetic circuit 112 decrypts the initialization command using the key stream KS for key exchange in step s13. The decrypted initialization command is inputted to the command decoder 12.

When the command decoder 12 analyzes the initialization command, processing of initializing the cipher processing device 11 using the formal common key 550 (the memory random number 200 and the host random number 600) is performed in step s14. More specifically, the cipher processing unit 110 initializes the cipher processing unit 110 based on the inputted formal common key 550, that is, based on the host random number 600 and the memory random number 200. Further, the initialized cipher processing unit 110 generates the session key SK using the cipher function of the cipher processing unit 110, and outputs the session key SK. The cipher processing unit 111 initializes the cipher processing unit 111 based on the session key SK generated by the cipher processing unit 110. Further, the initialized cipher processing unit 111 generates the key stream KS using the cipher function of the cipher processing unit 111, and outputs the key stream KS. Thereafter, the cipher processing device 11 decrypts the command from the host device 30 using the key stream KS outputted from the cipher processing unit 111. Further, the memory data 400 from the memory array 13 is encrypted using the key stream KS outputted from the cipher processing unit 111.

Similar to the semiconductor memory 20, the host device 30 performs processing of initializing the host side cipher processing device using the formal common key including the host random number 600 and the memory random number 200. The initialized host side cipher processing device encrypts the command to be transmitted to the semiconductor memory 20 using the key stream, and decrypts the ciphered data 570 (encrypted memory data 400) from the semiconductor memory 20 using the key stream.

Thus, by performing key exchange (exchanging the random numbers in this example) between the host device 30 and the semiconductor memory 20, it is possible to realize mutual authentication between the host device 30 and the semiconductor memory 20.

Further, as in this example, by using as information of high confidentiality in terms of security the random number 200 of high uniformity generated using part of the cipher processing device 11 (cipher processing unit 110), it is possible to generate information of high confidentiality in terms of security at low cost.

Furthermore, as in this example, by using as a key the random number 200 of high uniformity generated using part of the cipher processing device 11, security of keys to be generated or keys to be exchanged can be secured and, as a result, security of cipher communication can be secured at low cost.

Furthermore, the cipher processing unit 110 which functions as a key generating unit generates the memory random number 200 which is a first key using the data 100 and the cipher function of the cipher processing unit 110 in step s5. Moreover, the cipher processing unit 110 generates the session key SK which is a second key using the first key and the cipher function of the cipher processing unit 110 in step s14. Thus, by generating the second key using the first key generated by the cipher processing unit 110, the cipher processing unit 110 can generate a key of high security with a simple configuration. That is, it is possible to generate a key of high security at low cost. Further, the cipher processing unit 110 generates the first key using the data 100 outputted from the uncertain circuit 10, so that it is possible to enhance security of the first key. Although the first key (memory random number 200) is not used in the cipher processing unit 111 in the above example, the cipher processing unit 111 may use the first key as the key of the cipher processing unit 111 when, for example, the memory system 50 does not perform key exchange.

Although the memory random number 200 generated by the cipher processing device 11 is used by the cipher processing device 11 in the above example, the memory random number 200 may be used in another device. Further, although a plurality of cipher processing units is provided in the cipher processing device 11 in the above example, only one cipher processing unit may be provided. Furthermore, although key exchange is performed between the host device 30 and the semiconductor memory 20 in the above example, key exchange may not be performed. In this case, in the semiconductor memory 20, only the memory random number 200 generated by the cipher processing device 11 configures the formal common key 550. Also, in the host device 30, only the memory random number 200 outputted from the semiconductor memory 20 configures an formal common key in the host side cipher processing device. Furthermore, instead of providing the uncertain circuit 10, the cipher processing device 11, and the like in the semiconductor memory 20 in which a semiconductor element is used in a storage region (storage element) as in the present preferred embodiment, the uncertain circuit 10, the cipher processing device 11, and the like may be provided in a storage device in which a semiconductor element is not used in a storage region.

Although the random number generating device 1, the semiconductor memory 20, and the memory system 50 have been described in detail, the above description is exemplary in all aspects and the present invention is not limited thereto. Further, the above various modified examples can be applied in combination as long as the various modified examples do not contradict each other. Further, an infinite number of modified examples which are not illustrated can be conceived without deviating from the scope of the present invention.

While the invention has been shown and described in detail, the foregoing description is in all aspects illustrative and not restrictive. It is therefore understood that numerous modifications and variations can be devised without departing from the scope of the invention.

What is claimed is:

1. A random number generating device comprising:
   an uncertain circuit configured to output uncertain data; and
   cipher processing circuitry configured to
     receive input data different from the uncertain data;
     receive the uncertain data;
     encrypt the input data using a cipher function of said cipher processing circuitry to generate ciphered data different from the uncertain data;
     output the ciphered data; and
     initialize the cypher processing circuitry based on the uncertain data, wherein the cipher processing circuitry as initialized is configured to generate a random number having higher uniformity than the uncertain data using the cipher function of said cipher processing circuitry.

2. The random number generating device according to claim 1, wherein said random number is used as a key used in cipher or as an authentication code used in authentication.

3. The random number generating device according to claim 2, wherein said random number is inputted as a key to said cipher processing circuitry.

4. A storage device comprising:
   a random number generating device; and
   a memory, wherein
   said random number generating device includes
     an uncertain circuit configured to output uncertain data, and
     a cipher processing circuitry,
   said cipher processing circuitry is configured to
     receive input data different from the uncertain data;
     receive the uncertain data;
     encrypt the input data using a cipher function of said cipher processing circuitry to generate ciphered data different from the uncertain data;
     output the generated ciphered data; and
     initialize the cypher processing circuitry based on the uncertain data, and
   the cipher processing circuitry as initialized is configured to generate a random number having higher uniformity than the uncertain data using the cipher function of said cipher processing circuitry.

5. An information processing system comprising:
   a storage device which includes a random number generating device and a memory; and
   a host device configured to control said storage device, wherein said random number generating device includes
     an uncertain circuit configured to output uncertain data, and
     a cipher processing circuitry,
   said cipher processing circuitry is configured to
     receive input data different from the uncertain data;
     receive the uncertain data;
     encrypt the input data using a cipher function of said cipher processing circuitry to generate ciphered data different from the uncertain data;
     output the generated ciphered data; and
     initialize the cypher processing circuitry based on the uncertain data, and
   the cipher processing circuitry as initialized is configured to generate a random number having higher uniformity than the uncertain data using the cipher function of said cipher processing circuitry.

* * * * *